US009112380B2

(12) United States Patent  
Bouchez et al.

(10) Patent No.: US 9,112,380 B2  
(45) Date of Patent: Aug. 18, 2015

(54) METHOD FOR DISTRIBUTING THE TOTAL CONVERSION POWER BETWEEN THE CONVERTERS OF A MULTIPLE-CONVERTER CONVERSION DEVICE

(75) Inventors: Boris Bouchez, Cergy le Haut (FR); Luis De Sousa, Eragny sur Oise (FR)

(73) Assignee: Valeo Systemes de Controle Moteur, Cergy Pontoise Cedex (FR)

( * ) Notice: Subject to any disclaimer, the term of this patent is extended or adjusted under 35 U.S.C. 154(b) by 576 days.

(21) Appl. No.: 13/404,672

(22) Filed: Feb. 24, 2012

(65) Prior Publication Data

US 2012/0217948 A1  Aug. 30, 2012

(30) Foreign Application Priority Data

Feb. 25, 2011  (FR) ...................................... 11 51536

(51) Int. Cl.
*H02J 1/10* (2006.01)
*H02M 3/28* (2006.01)
*H02M 7/493* (2007.01)

(52) U.S. Cl.
CPC .............. *H02J 1/102* (2013.01); *H02M 3/285* (2013.01); *H02M 7/493* (2013.01)

(58) Field of Classification Search
CPC . H02M 3/1584; H02M 3/1588; H02M 3/285; H02M 7/493; H02M 7/49
USPC .......... 323/272, 358; 363/65, 71, 72
See application file for complete search history.

(56) References Cited

U.S. PATENT DOCUMENTS

| 5,905,645 | A | 5/1999 | Cross |
| 6,252,785 | B1 | 6/2001 | Hagihara et al. |
| 6,466,469 | B1* | 10/2002 | Caruthers et al. ............... 363/72 |
| 6,625,045 | B1* | 9/2003 | Lethellier ...................... 363/89 |
| 8,219,250 | B2* | 7/2012 | Dempster et al. ............. 700/276 |
| 2004/0041473 | A1* | 3/2004 | Deguchi .......................... 307/82 |
| 2008/0129260 | A1* | 6/2008 | Abu Qahouq et al. ........ 323/272 |
| 2012/0271462 | A1* | 10/2012 | Dempster et al. ............. 700/276 |

OTHER PUBLICATIONS

French Search Report issued in the corresponding French application No. 1151536, mailing date Oct. 6, 2011 (2 pages).

* cited by examiner

*Primary Examiner* — Jue Zhang  
*Assistant Examiner* — Lakaisha Jackson  
(74) *Attorney, Agent, or Firm* — Osha Liang LLP

(57) ABSTRACT

A method for distributing the total power of an energy conversion device between at least two converters in the energy conversion device is disclosed. The sum of the conversion powers of the converters is the total power of the conversion device. The energy conversion device converts energy between a first electrical entity and a second electrical entity, where the two converters correspond to at least two portions of a ring, the portions being proportional to a predetermined power value of the respective converters thereof, the combination of the at least two portions forming the whole ring. The total power of the conversion device corresponds to an arc of the ring between the positions of a first slider and a second slider moveable around the ring, and the distribution of power between the converters is determined by the positions of the first and second sliders.

11 Claims, 6 Drawing Sheets

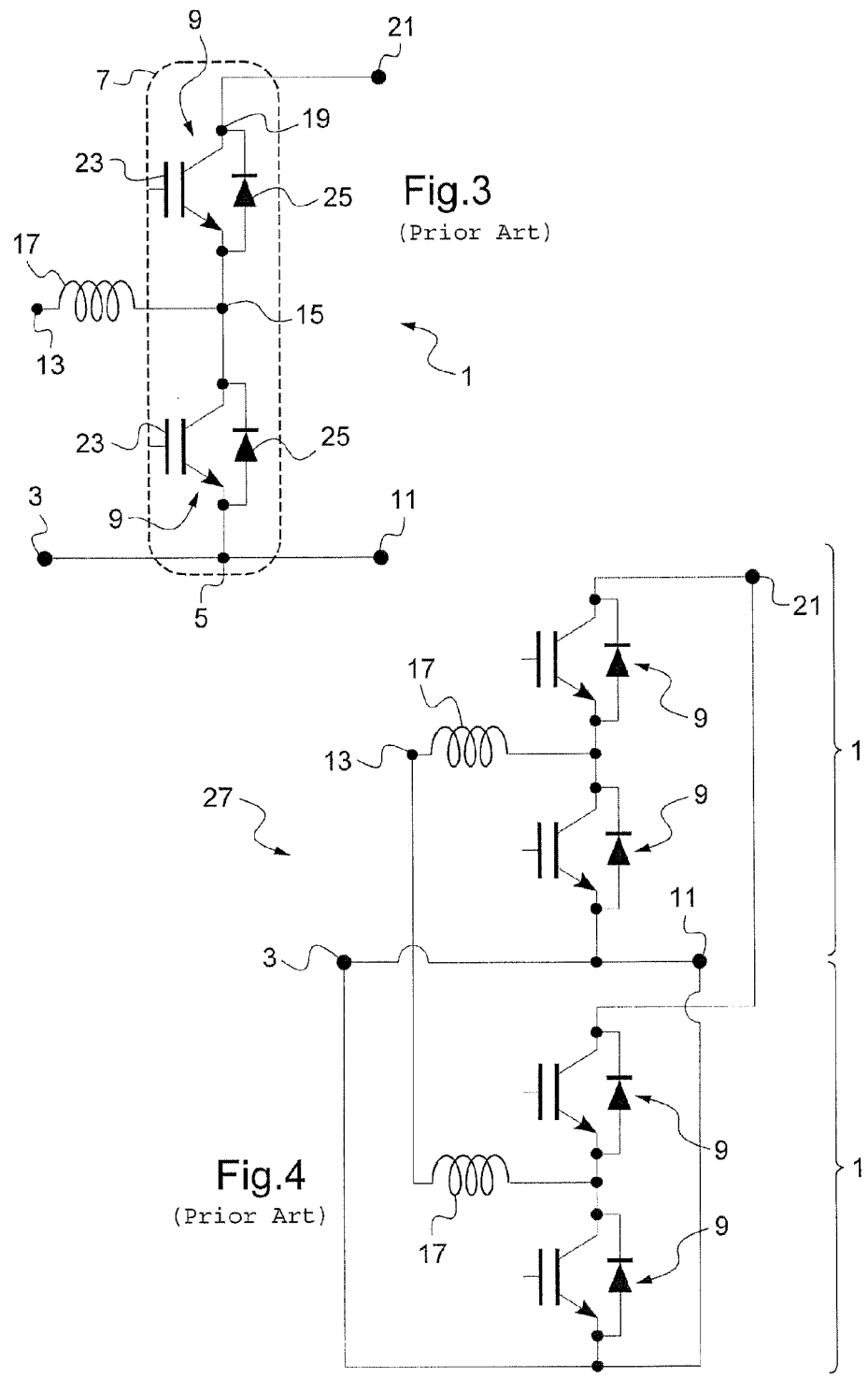

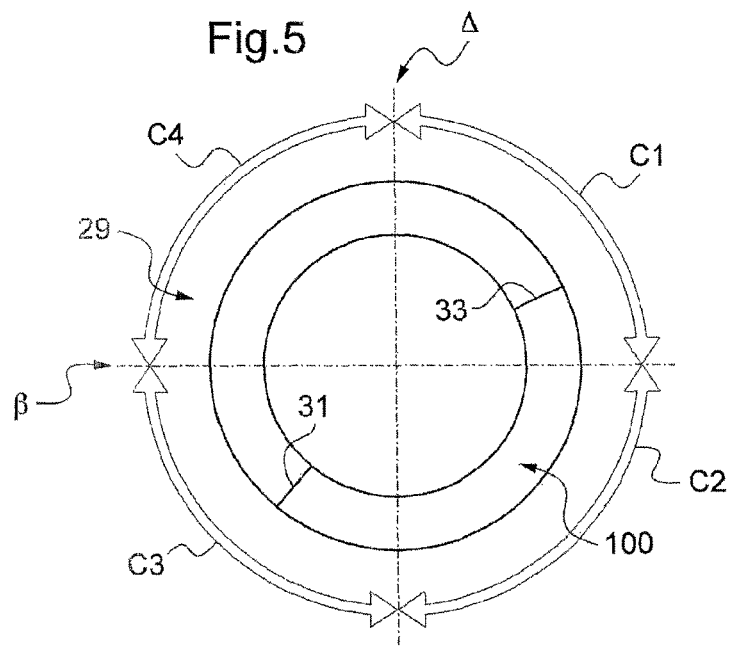
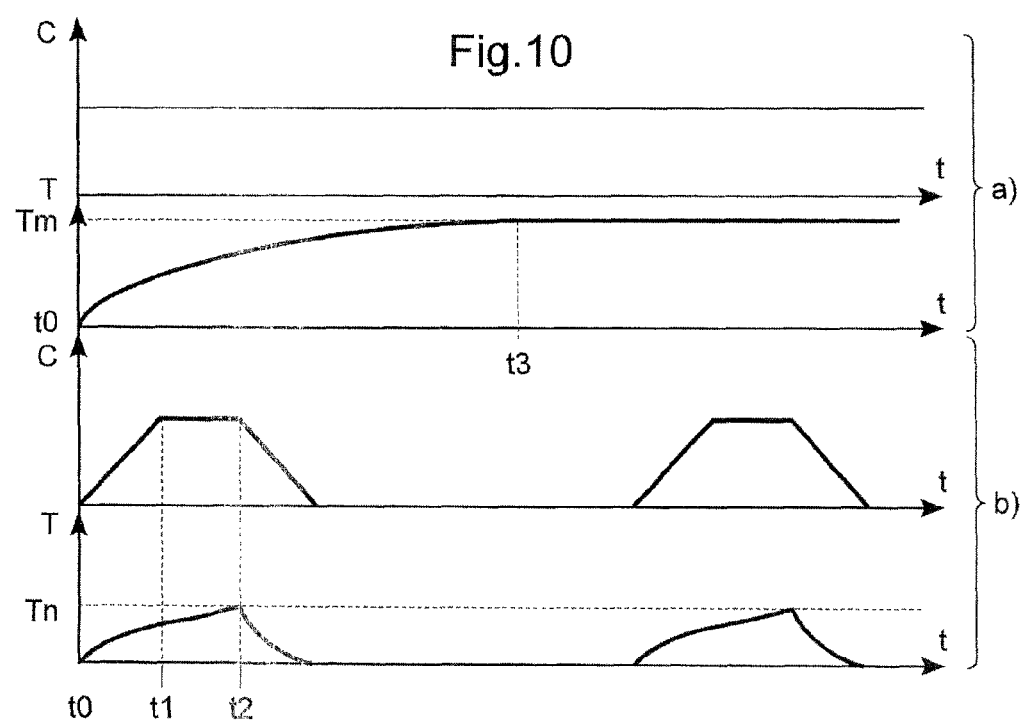

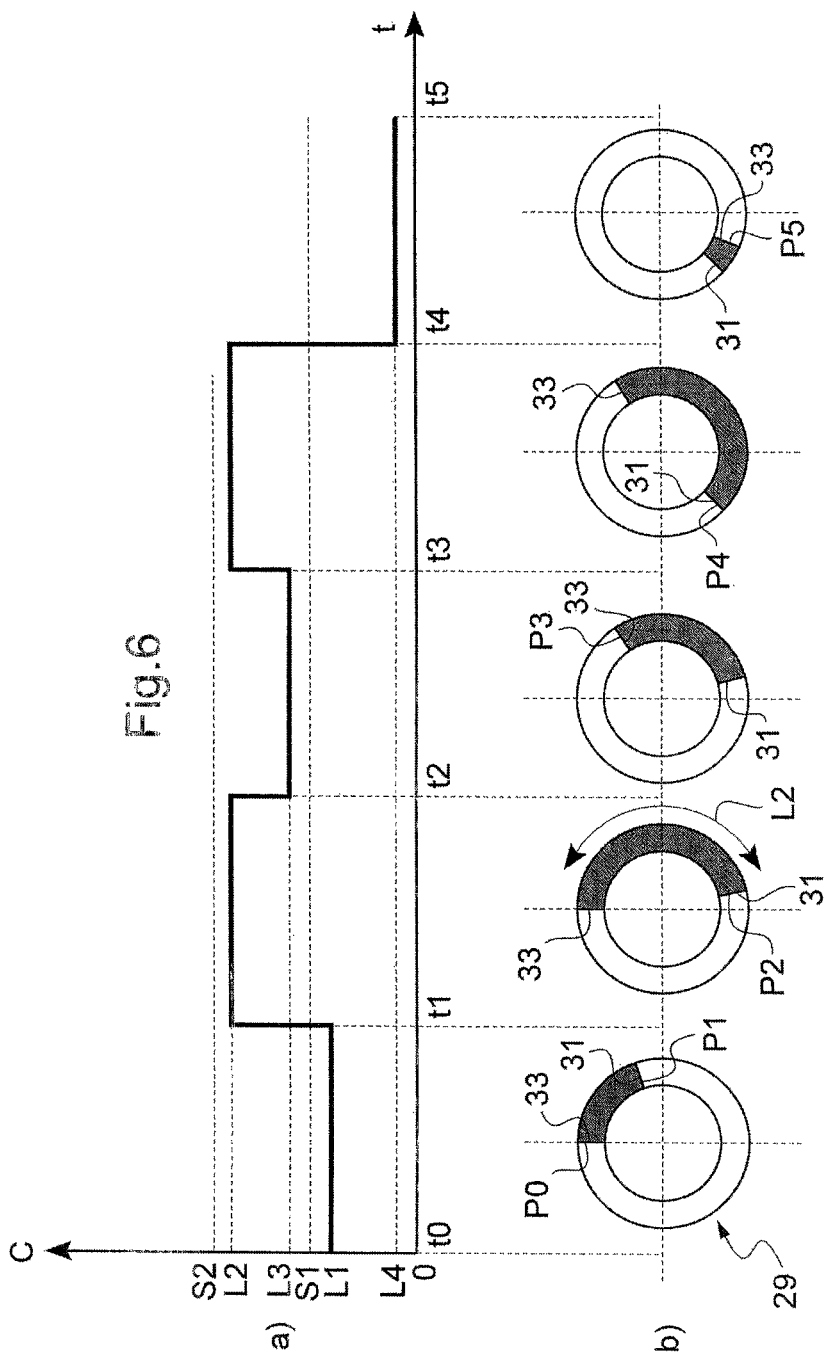

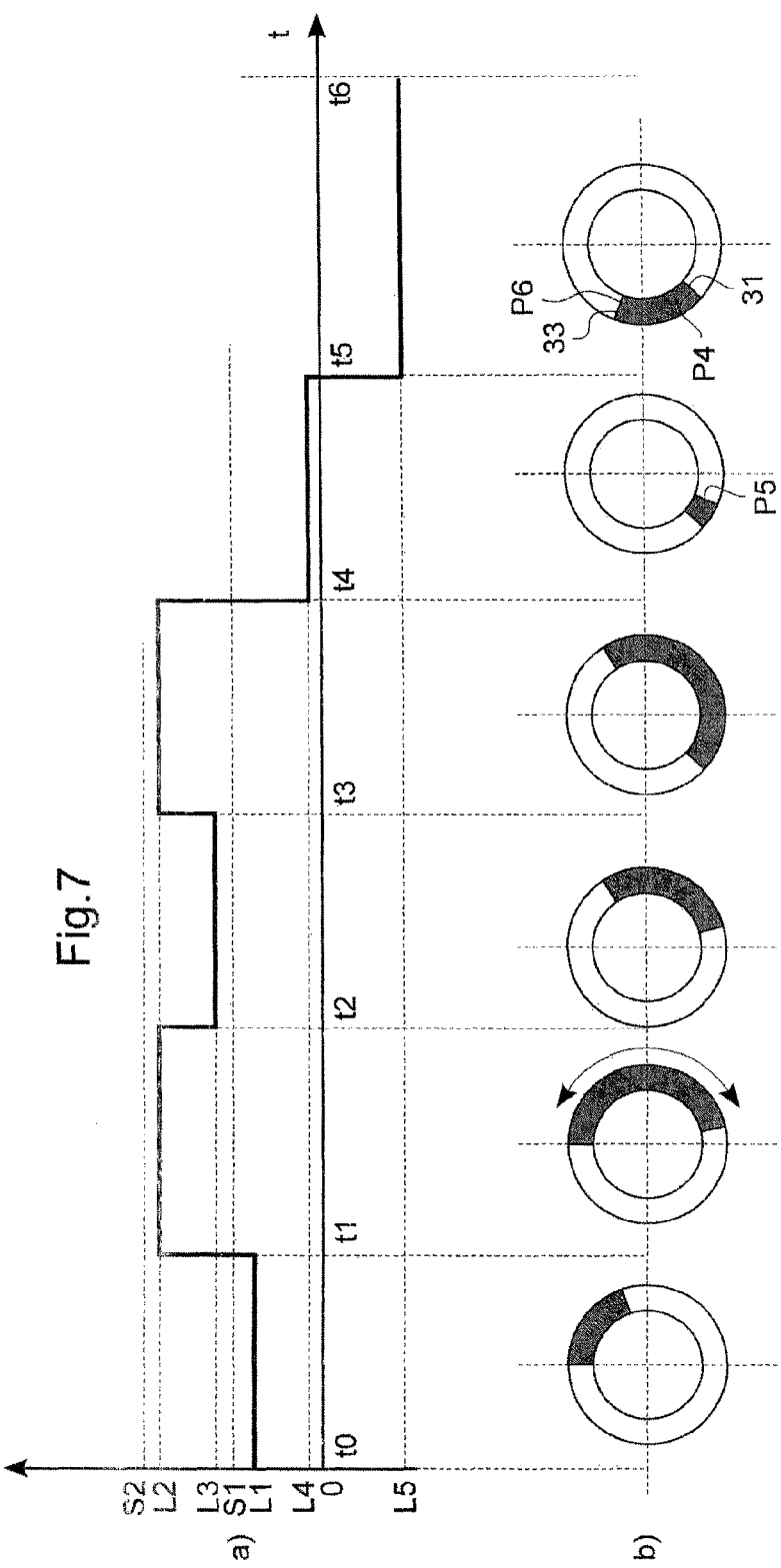

METHOD FOR DISTRIBUTING THE TOTAL CONVERSION POWER BETWEEN THE CONVERTERS OF A MULTIPLE-CONVERTER CONVERSION DEVICE

This invention relates to the domain of energy converters and more specifically conversion devices with multiple converters and the distribution of power between the different converters.

Typically, a converter supplies a power, known as conversion power, to perform the conversion function. Moreover, a converter draws a power for the intrinsic operation thereof. The efficiency of a converter is related to the ratio between the conversion power and the power drawn by the converter.

The use of conversion devices with multiple converters in which a high-power converter is replaced by a plurality of lower power converters operating in parallel supplying an aggregate power equal to the power supplied by the high-power converter is known in the prior art. Thus, if the conversion power is low, some converters can be deactivated to save the corresponding power draw thereof.

Furthermore, the efficiency R of a converter as a function of the power C supplied thereby, as shown in FIG. 1, is not constant. Efficiency is low for low power supplies. It would therefore appear necessary to avoid working in the low-power zone Z1, in which efficiency is low, and encourage use of the converter in the rated zone Z2 and the high-power zone Z3, where efficiency is high.

Thus, the use of conversion devices with multiple converters avoids the need to use a high-power converter in the low-efficiency zone thereof when the conversion power thereof is low.

However, the use of multiple-converter conversion devices involves the need to manage the distribution of the total conversion power between the different converters.

FIG. 2 shows an example trend of a conversion power C as a function of time t and the corresponding trend of the respective supplied powers of the different converters in the case of a conversion device with four converters. The powers of the converters are shown by Graphs A, B, C and D. Thus, as the total conversion power increases, the first converter (Graph A) is used up to a first power threshold S1 (corresponding to the maximum power of the first converter), reached at instant t1. Beyond the threshold S1, the second converter (Graph B) is also used up to a second threshold S2 (corresponding to the sum of the maximum powers of the first converter and the second converter), reached at instant t2. Equally, the thresholds S3 and S4 are defined by the third and fourth converters (Graphs C and D). At instant t4, the four converters are used, then the conversion power decreases. The conversion power of the fourth converter is then reduced, then the conversion power of the third converter is reduced, and so on if the conversion power continues to decrease.

Thus, with this power distribution, the first converter (Graph A) is used almost constantly, while the fourth converter (Graph D) is rarely used. This uneven usage tends to cause a premature wearing of the conversion device due to a premature wearing of the first converter.

The objective of this invention is therefore to disclose a method for distributing the total conversion power between the converters of a multiple-converter conversion device enabling a near-equal usage of the different converters. The objective of the invention is also to disclose a simple method that does not require complex implementation means.

For this purpose, the invention relates to a method for distributing the total power of an energy conversion device between at least two converters in said energy conversion device, one converter being deactivated when not under load and activated when under load, the sum of the conversion powers of the converters being the total power of the conversion device, the energy conversion device converting energy between a first electrical entity and a second electrical entity, characterised in that:

each converter corresponds to a term in a periodic sequence of period n, n being the number of converters in the conversion device, and the use of said converters is switched progressively according to said periodic sequence to balance the conversion power of at least two converters over time.

According to one embodiment, switching usage of said converters according to said periodic sequence comprises the following steps:

when the total power of the conversion device increases and the conversion power of the last of the active converters activated is greater than or equal to a first predetermined threshold, the increase is applied to the next converter in the periodic sequence and, if the total power of the conversion device decreases, the decrease is applied to the first of the active converters activated.

According to one embodiment, the first predetermined power threshold is the maximum power of the converter.

According to one embodiment, if a single converter is active and the accumulated conversion power of said converter over time since activation thereof reaches a second predetermined threshold, the next converter in the periodic sequence is activated.

According to one embodiment, the converters are reversible, and energy conversion may be effected firstly to the second entity and secondly to the first entity.

According to one embodiment, the first entity is a voltage source and the second entity is a device used to power an electric motor.

According to one embodiment, the energy conversion device has four converters. According to one embodiment, the power of the converters is distributed as a function of the efficiency characteristics of the converters.

According to one embodiment, a continuous progressive switching of converter activation is commanded according to the periodic sequence.

According to one embodiment, the continuous progressive switching speed is determined as a function of the thermal time constant of the converters.

According to one embodiment, the continuous progressive switching speed of a first predetermined speed value is increased if the conversion efficiency is less than a first predetermined efficiency value.

According to one embodiment, the continuous progressive switching speed of a second predetermined speed value is reduced if the conversion efficiency is greater than a second predetermined efficiency value.

According to one embodiment, said at least two converters correspond to at least two portions of a ring, the portions being proportional to a predetermined power value of the respective converters thereof, the combination of the at least two portions forming the whole ring;

the total power of the conversion device corresponds to an arc of the ring between the positions of a first slider and a second slider that are moveable around the ring; and in which the distribution of power between the converters is determined by the positions of the first slider and the second slider that are moveable around the ring.

The invention also relates to a method for distributing the total power of an energy conversion device between at least two converters in said energy conversion device,
the sum of the conversion powers of the converters being the total power of the conversion device,
the energy conversion device converting energy between a first electrical entity and a second electrical entity, characterised in that:
said at least two converters correspond to at least two portions of a ring, the portions being proportional to a predetermined power value of the respective converters thereof, the combination of the at least two portions forming the whole ring; and in that
the total power of the conversion device corresponds to an arc of the ring between the positions of a first slider and a second slider that are moveable around the ring, and
the distribution of power between the converters is determined by the positions of the first slider and the second slider that are moveable around the ring.

According to one embodiment, the positions of said first and second moveable sliders are adjusted such that:
when the total power of the conversion device increases, the first moveable slider is moved in a predetermined direction around the ring proportionally to the power increase and,
when the total power of the conversion device drops, the second moveable slider is moved in a predetermined direction around the ring proportionally to the power decrease.

According to one embodiment, the positions of the portions of the ring may be moved in rotation about the centre of the ring, the movement of the portions corresponding to a modification of the power distribution between the different converters.

According to one embodiment, the movement in rotation of the portions is a function of the efficiency characteristics of the converters.

According to one embodiment, the portions are moved in rotation continuously.

According to one embodiment, the speed of movement in rotation of the portions is a function of the thermal time constant of the converters.

According to one embodiment, the speed of movement in rotation of the portions is increased by a first predetermined speed value if the conversion efficiency of the conversion device is less than a first predetermined efficiency value.

According to one embodiment, the speed of movement in rotation of the portions is reduced by a second predetermined speed value if the conversion efficiency of the conversion device is greater than a second predetermined efficiency value.

The invention also relates to a device for converting energy between a first electrical entity and a second electrical entity, the energy conversion device comprising at least two converters characterised in that it also comprises a processing unit configured to implement a power distribution method according to the invention.

According to one embodiment, the processing unit includes:
a module incorporating a representation of a geometric ring, said at least two converters corresponding to at least two portions of the ring, the portions being proportional to a predetermined power value of the respective converters thereof, the combination of the at least two portions forming the whole ring;
a memory storing the positions of a first slider and a second slider that are moveable around the ring, the total power of the conversion device corresponding to an arc of the ring between the positions of the first and second sliders moveable around the ring, and
a module for distributing the power between the converters determined by the positions of the first slider and the second slider that are moveable around the ring.

According to one embodiment, said at least two converters comprise:
a first input terminal connected firstly to a first extremity of a branch comprising two switches mounted in series and secondly to a first output terminal, and
a second input terminal connected to the midpoint of the branch by means of an inductive element, the second extremity of the branch being a second output terminal, the first input terminals of the converters being connected to each other, the second input terminals of the converters being connected to each other, the first output terminals of the converters being connected to each other, and the second output terminals of the converters also being connected to each other.

According to one embodiment, the converter switches include a transistor mounted in parallel with a diode.

Other characteristics and advantages of the invention are set out in the description provided below, with reference to the attached drawings, which show a possible embodiment thereof by way of non-limiting example.

In these drawings, the same reference numbers represent the same elements:

FIG. 3 is a wiring diagram of a converter;

FIG. 4 is a wiring diagram of a conversion device comprising two converters mounted in parallel;

FIG. 5 is a diagram of a power ring according to this invention;

FIG. 6 is a first example of a power trend over time and the application of the power ring in FIG. 5 as a function of this trend;

FIG. 7 is a second example of a power trend over time and the application of the power ring in FIG. 5 as a function of this trend;

FIG. 10 is an example trend of power and temperature of a converter over time for two different configurations;

Figure 1:
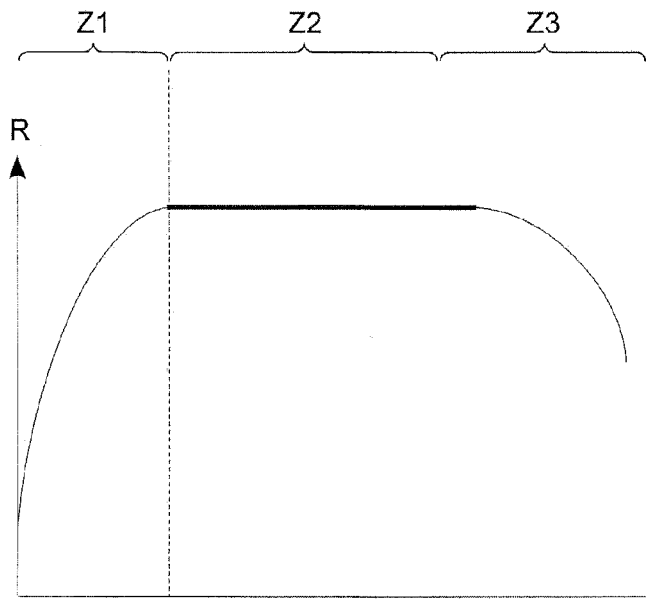
FIG. 1 is a graph of a characteristic of the efficiency of a converter as a function of the conversion power.

The following general definitions apply to the description below:

The term "insulated gate bipolar transistor (IGBT)" is a hybrid transistor, incorporating a metal-oxide semiconductor field effect transistor (MOSFET) input and a bipolar transistor output.

The term "periodic sequence of period n" refers to a sequence of terms $x_i$ such that the ith and the (i+1)th term are identical.

In other words, the term "periodic sequence of period n" corresponds to an "ordered and looped sequence". The term "ordered and looped sequence" applied to a plurality of elements corresponds to arranging the elements from a first to a last element in a loop, each element appearing only once in the loop, such that the element following the last element is the first element (and implicitly the element before the first element is the last element). If there are three elements marked 1, 2 and 3, two ordered closed-loop sequences are possible:

firstly the sequence corresponding to the loop 1-2-3 (corresponding to the loops 2-3-1 and 3-1-2), and secondly the sequence corresponding to the loop 1-3-2 (corresponding to the loops 3-2-1 and 2-1-3).

The embodiments of this invention relate to the distribution of the total conversion power between the converters of a multiple-converter energy conversion device, i.e. one comprising several converters.

The conversion device enables the energy received in a first form from a first electrical entity to be converted into a second energy form transmitted to a second electrical entity. The first electrical entity is for example a voltage source such as accumulation means. The second electrical entity is for example a device intended to power an electric motor to drive a motor vehicle, such as an electrical control circuit of an electric motor. In this case, the two energy forms are two direct voltages having respectively a first amplitude and a second amplitude.

However, the scope of the embodiments of this invention is not limited to these examples of electrical entities or to the examples of converters described in the description below. The invention applies to all energy converters linking two electrical entities.

FIG. 3 shows an example converter 1 comprising:

a first input terminal 3 connected firstly to a first extremity 5 of a branch 7 comprising two switches 9 mounted in series and secondly to a first output terminal 11, and a second input terminal 13 connected to the midpoint 15 of the branch 7 (corresponding to a point located between the two switches 9) by means of an inductive element 17, the second extremity 19 of the branch being connected to a second output terminal 21.

The switches 9 comprise a transistor 23, usually an IGBT, mounted in parallel with a diode 25, which creates a reversible converter. Thus, conversion can be effected from the input terminals 3 and 13 to the output terminals 11 and 21 and vice versa. If conversion is effected from the input terminals 3 and 13 to the output terminals 11 and 21, the converter is a step-up circuit. If conversion is effected from the output terminals 11 and 21 to the input terminals 3 and 13, the converter is a step-down circuit.

FIG. 4 shows a conversion device 27 comprising two converters as described in FIG. 3 mounted in parallel. Paralleling involves connecting:

the first input terminals 3 to each other,
the second input terminals 13 to each other,
the first output terminals 11 to each other, and
the second output terminals 21 to each other.

The conversion device 27 therefore comprises two output terminals 11 and 21 and two input terminals 3 and 13 as is the case with a single converter.

By connecting the input and output terminals of the converters 1 in the same fashion, any number of converters 1 may be paralleled. The converters 1 therefore form a conversion device 27. The total power of the conversion device 27 is the sum of the conversion powers of the converters 1. Thus, a large number of low-power converters 1, i.e. converters that can transmit a low power, can replace one high-power converter, i.e. a converter that can transmit a high power.

Paralleling the converters 1 makes it possible to use certain converters 1 while the others are deactivated. For example, in the case of low total conversion power, some converters 1 can be deactivated in order to save energy and therefore to optimise the overall efficiency of the conversion device 27. Thus, if a converter is no longer under load (i.e. the conversion power thereof is zero), it is deactivated such that it draws no power.

In the case of converters 1 as described in FIG. 4, this deactivation may be effected by leaving the switches 9 of the corresponding converter 1 open.

Furthermore, in order to prevent an imbalance in the use of the converters over time and to enable an even wearing of the different converters, the embodiments of this invention describe the application, by a processing unit, of a "rotation" or switching related to the use of the different converters.

In order to apply this rotation, each converter 1 corresponds to a term in a periodic sequence of period n. The period n of the periodic sequence is the number of converters 1 in the conversion device 27.

Thus, the use of the converters is switched progressively according to the periodic sequence. This makes it possible to balance the conversion power of the converters 1 over time.

During the first use of the conversion device (or on each activation of the conversion device), an initialisation process selects, in a predetermined or random manner, a converter to be active. The converter selected begins to supply the power of the conversion device 27.

Once the initialisation process is complete and one of the converters is activated, according to one embodiment of this invention, the power is then distributed as follows.

When the total power of the conversion device 27 increases, the increase is applied to the last of the active converters 1 activated. In other words, the conversion power of the last converter 1 activated increases in line with the increase in the total power of the conversion device 27.

When the total power of the conversion device 27 increases and the conversion power of the last of the active converters I activated reaches a first predetermined threshold, the increase in the total power of the conversion device 27 is applied to the next converter 1 in the periodic sequence. If it is inactive, the next converter 1 in the periodic sequence is activated.

For example, the values of the first predetermined thresholds are defined such as to optimise the efficiency of the converters.

For example, the first predetermined threshold of a converter 1 is the maximum power level that can be supplied by the converter. Thus, the conversion device 27 provides a maximum power when all of the converters 1 are activated at a power level equal to the respective predetermined thresholds thereof.

If the total power of the conversion device 27 decreases, the decrease is applied to the first of the active converters 1 activated.

If the first of the active converters activated is no longer under load (i.e. the conversion power thereof is zero), it is deactivated. When a converter is deactivated, the power drawn by that converter is zero. Thus, the power drawn by the conversion device 27 is reduced. The next converter in the periodic sequence then becomes the first of the active converters activated. Subsequent power reductions are then applied to this converter.

Furthermore, according to one embodiment, in order to avoid always using the same converter during a duty cycle of the conversion device in which the power variations are low for a long period of time, a total conversion power over time since activation thereof, i.e. the energy supplied by the converter from the time it is activated, can be determined. Thus, if a single converter is active and the accumulated conversion power of this converter over time, since activation thereof, reaches a second predetermined threshold, the next converter in the periodic sequence is activated. Thus, in the event of an increase of the total conversion power of the device, this power is added to the conversion power of the newly activated converter (in the event of a reduction of the total conversion power of the conversion device, this power reduction is applied to the conversion power of the first of the active converters activated).

This second predetermined threshold is, for example, determined on the basis of the thermal time constant of the converter. This prevents the converter 1 from overheating.

The distribution of power may be represented simply using a geometric ring referred to below as the power ring. A representation of such a ring 29 is provided in FIG. 5 in the case of four converters of the same power mounted in parallel. The different converters correspond to a portion of the ring 29. Taken together, the portions make up the entire ring 29. The portions are proportional to the first power threshold of the respective converters. In the example given in FIG. 5, the four converters 1 have the same first predetermined threshold value, such that the different proportions are the same size. In a specific example, the first threshold is the maximum power level that can be supplied by a converter.

If, for example, each converter has a power of 10 kW, one quarter ring is equivalent to 10 kW and the entire ring corresponds to 40 kW. Thus, if the power amounts to 15 kW, only two converters are required and the other two may be deactivated.

In FIG. 5, the power ring 29 is divided into four portions, delimited by a vertical axis Δ and a horizontal axis β. The portions are quarter rings marked respectively C1, C2, C3 and C4. In the remainder of the description, the corresponding converters shall also be referred to as C1, C2, C3 and C4.

Moreover, the ring 29 has a first slider 31 and a second slider 33 that are movable around the ring 29 and that define the distribution of power between the four converters. The total power of the conversion device 27 corresponds to an arc 100 of the ring 29 between the positions of the first slider 31 and the second slider 33 that are moveable around the ring 29.

Thus, the positions of the first movable slider 31 and the second movable slider 33 are determined such that when the total power of the conversion device 27 increases, the first moveable slider 31 is moved in a predetermined direction around the ring 29, proportionally to the power increase.

If the total power of the conversion device 27 drops, the second moveable slider 33 is moved in the same predetermined direction around the ring 29 proportionally to the power decrease.

Thus, the positions of the sliders 31, 33 define the power distribution of the converters 1 of the conversion device 27.

For example, the predetermined direction is clockwise. In order to better explain the operation of the power ring 29, an example trend of the distribution of power over time is described in relation to FIG. 6.

FIG. 6 comprises two parts a), b). The top part a) shows the trend of the total power of the conversion device 27 as a function of time t. The bottom part b) shows the trend of the corresponding positions of the first slider 31 and the second slider 33 around the ring 29.

Initially, the two sliders 31 and 33 are positioned in the same place on the ring 29, at an intermediate point between two portions of the ring 29. For example, the two sliders 31 and 33 are positioned at point P0 if the converter C1 has been selected during the initialisation process.

Immediately after the instant t0, the total power of the device 27 increases up to a first power level L1, the first slider 31 then moves around the ring 29 by a distance proportional to the first power level L1 to reach position P1. The route of the first slider 31 is entirely within the portion of the converter C1. The power increase is therefore borne solely by the first converter C1 such that only this first converter is active. As the power is constant between instants t0 and t1, the first slider 31 remains in position P1.

Immediately after instant t1, the total power of the device 27 increases up to a second power level L2. The first slider 31 is moved around the ring 29 by a distance proportional to the power increase L2-L1 of the device 27. The first slider 31 reaches position P2, which is in the portion corresponding to the converter C2. The power increase L2-L1 of the device 27 is therefore borne by the first converter C1 then by the second converter C2. Thus, at instant t2, both converters C1, C2 are active.

Immediately after instant t2, the power level of the device 27 drops to level L3. The second slider 33 is moved around the ring 29 by a distance proportional to the power drop L2-L3. The second slider 33 is moved from position P0 to position P3. Positions P0 and P3 are on the portion corresponding to converter C1. The power drop is then applied to the first converter C1 (which is the first of the active converters activated). Thus, at instant t3, both converters C1, C2 are active.

Immediately after instant t3, the power level of the device 27 returns to level L2. The first slider 31 is moved around the ring 29 by a distance proportional to the power increase L2-L3. The first slider 31 is moved from position P3 to position P4, which is in the portion corresponding to converter C3. The power increase L2-L3 of the device 27 is therefore borne by the second converter C2 then by the third converter C3. Thus, at instant t4, all three converters C1, C2, C3 are active.

Immediately after instant t4, the power level drops to a level L4. The second slider 33 is moved around the ring 29 by a distance proportional to the power drop L2-L4. The second slider 33 is moved from position P3 to position P5, which is in the portion corresponding to the converter C3. Thus, at instant t5, the first converter C1 and the second converter C2 are inactive; only converter C3 is active.

Consequently, application of such an embodiment makes it possible to distribute the total conversion power throughout all of the converters during the power increase and decrease cycles, even if the instantaneous total conversion power is low.

Moreover, as described above, the conversion device 27 is reversible and can therefore work in both directions, from a first electrical entity to a second electrical entity or from the second electrical entity to the first electrical entity.

Assuming again that the electrical entities connected to the conversion device are respectively accumulation means and an electrical control circuit of an electric motor intended to drive a motor vehicle, the first conversion direction corresponds to powering the motor using accumulation means while the opposing direction corresponds to regenerative braking enabling the accumulation means to be recharged. The power is then distributed between the different converters in the same manner for both directions of power transfer.

Power conversion in the opposing direction can be considered to be a "negative" power. In other words, a negative power corresponds to a power transfer from the second electrical entity to the first electrical entity. However, the movements of the first slider 31 and the second slider 33 are exactly as described above.

Thus, on the power ring 29:
- if the "negative" power increases by an absolute value, i.e. the total power of the conversion device becomes increasingly negative, the second slider 33 moves in the predetermined direction, and
- if the "negative" power drops by an absolute value, i.e. the total power of the conversion device becomes decreasingly negative, the first slider 31 moves in the predetermined direction.

This can be better understood with reference to FIG. 7. FIG. 7 corresponds to FIG. 6, in which a conversion cycle corresponding to the period of time between t5 and t6 has been added. This cycle corresponds to a cycle in which the total power of the conversion device 27 is negative and corresponds to a level L5.

At instant t5, the power drops to zero. On the ring 29, this corresponds to an overlapping (not shown) of the positions of the first slider 31 and the second slider 33.

The total power of the conversion device 27 then becomes negative, indicating that the power is being transferred from the second entity to the first entity. The total conversion power drops to a level L5. The second slider 33 then moves from position P5 to position P6. Thus, the second slider 33 is "in front of" the first slider 31, the portion located "between" the two sliders 33 and 31 corresponding to the "negative" power.

Thus, use of the two sliders 31 and 33 makes it possible to manage power distribution in both directions of conversion.

However, when applying the power distribution described in the above embodiments, some converters 1 may be used in their low-power zone such that the overall efficiency is not optimum and may be further optimised.

Returning to FIG. 2, the conversion powers marked with the reference sign 2 correspond to a low efficiency of the converter 1, as described in zone Z1 in FIG. 1.

In order to avoid such a situation, according to one embodiment of this invention and as a function of the efficiency characteristics of the converters 1, the total power of the conversion device 27 is distributed such as to optimise the conversion efficiency between the converters 1.

Thus, in particular if the power is constant, if several converters 1 are activated, a progressive switching (or power transfer) between the last converter 1 activated and the first active converter 1 activated is applied in order to obtain a power distribution corresponding to an optimised conversion efficiency of the conversion device 27.

Indeed, on the basis of efficiency as a function of conversion power for a converter 1 (as described in FIG. 1), an optimum power distribution as a function of power may be calculated or determined for a conversion device 27 comprising a set of converters 1.

Nonetheless, in order to simplify implementation of such a distribution and on account of the fact that a converter used at the maximum conversion power thereof is efficient, this embodiment involves optimising the distribution of the partially used converters 1, i.e. the converter 1 activated last and the first of the active converters 1 activated (the other converters being used at full power or being inactive).

On the power ring 29, such a power distribution is shown by a rotational movement of the portions of the power ring 29.

Figure 8:
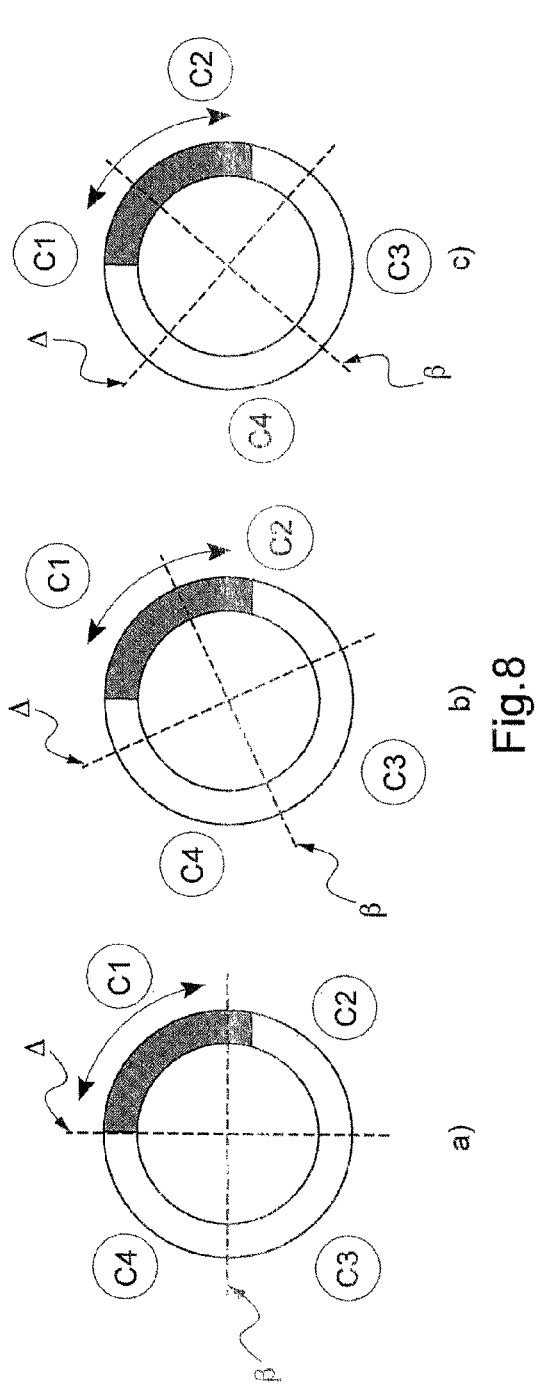
FIG. 8 is a first example of a power transfer in the power ring, as described in FIG. 5.

FIG. 8 shows three configurations of the power ring 29, previously described in FIG. 5, corresponding to three stages or instants of implementation of such an optimisation.

The first part a) of FIG. 8 shows an example of power distribution in which a first converter C1 is used at full power and a second converter C2 is used at low power (which corresponds to a low efficiency of the converter C2). The power of the conversion device 27 remains constant over time.

Power is transferred from the first converter C1 to the second converter C2. The transfer is represented on the ring 29 by a rotation of the portions about the centre of the ring 29.

Part b) of FIG. 8 shows an intermediate stage of such a power transfer. It should also be noted that power can also be transferred to the converter C4. In this case, the portions are rotated in the opposite direction. The portions are rotated to obtain a power distribution corresponding to an optimised efficiency. The optimised efficiency may, for example, be determined on the basis of a characteristic representing the efficiency of the converter 1 as a function of conversion power, and established by the manufacturer of the conversion device 27 and recorded in a memory of the conversion device 27.

Thus, in this example, the optimum distribution (corresponding to an optimised efficiency of the conversion device 27) corresponds to an equal distribution of the total power of the conversion device 27 between the two converters C1 and C2 as shown by the position of the axes on part c) of FIG. 8.

Furthermore, in the case of total power of the conversion device 27 remaining constant for a long period of time, the same converters 1 are used throughout this long period of time, which may in particular cause the overheating, and therefore premature wearing, thereof. In order to avoid such overheating, according to one embodiment of this invention, a continuous progressive switching of activation of the converters 1 is commanded according to the periodic sequence, such that:
- if only one converter is activated, power is transferred from the active converter to the next converter in the periodic sequence (applying this condition, a second converter is active such that the following example then applies).
- if several converters are activated, power is transferred from the first of the active converters activated to the last converter activated.

Application of this embodiment therefore enables the conversion power to be transferred continuously and successively to all of the converters 1. This transfer may be effected when the total power of the conversion device 27 is constant, or continuously, regardless of the trend of the total power of the conversion device 27.

Furthermore, it should also be noted that power can also be transferred to the previous converters.

On the power ring 29, the power transfer is represented by a continuous movement in rotation of the portions of the ring 29 (the direction of rotation then defining the direction of transfer (to the previous converters or to the next converters in the periodic sequence)).

However, according to one alternative embodiment, this movement in rotation of the portions of the ring 29 may be effected periodically, the amplitude and the rotation period being then predefined as a function of the characteristics and in particular the thermal time constant of the converters.

Figure 9:
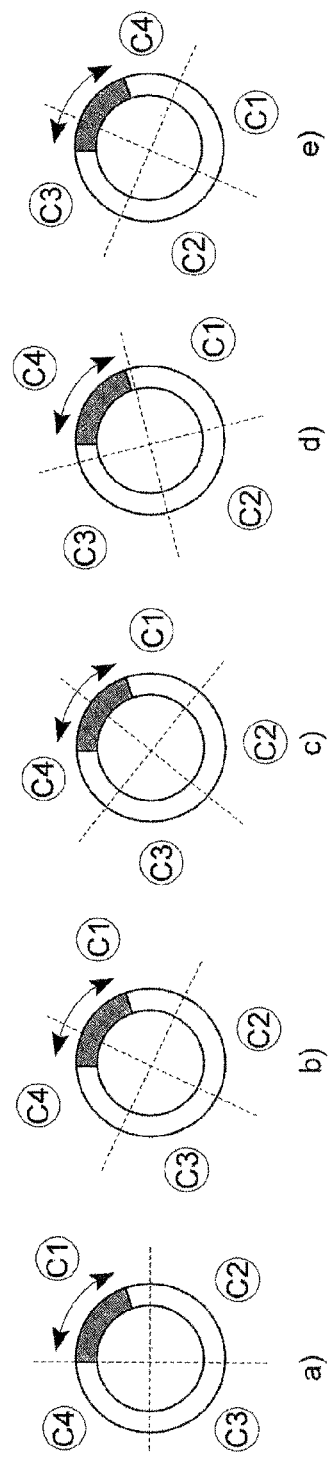
FIG. 9 is a second example of a power transfer in the power ring, as described in FIG. 5.

FIG. 9 shows the trend in the power distribution over time at five different instants during application of this embodiment. In the example in FIG. 9, the total power of the connection device 27 remains constant for five instants and the power is transferred to the previous converters 1 in the periodic sequence. At a first instant (part a)), the total power of the conversion device 27 is fully distributed to the first converter C1. At a second instant (part b)), one part of the power has been transferred from the first converter C1 to the fourth converter C4. At a third instant (part c)), the power is equally distributed between the first converter C1 and the fourth converter C4. At a fourth instant (part d)), the power is fully distributed to the fourth converter C4. At a fifth instant (part e)), one part of the power has been transferred from the fourth converter C4 to the third converter C3.

The power is therefore transferred continuously from one converter 1 to the next converter in the periodic sequence such as to obtain a near-equal use of the converters 1 over time.

Thus, applying a continuous rotation of the portions (corresponding to a continuous transfer to the previous (or next) converters), also distributes power to all of the converters over time, regardless of the power trend.

A continuous progressive switching (or transfer) of power from one converter 1 to the next converter has just been described, but the speed of this switching has not been discussed.

According to one embodiment of this invention, the switching speed is determined as a function of the thermal time constant of the converters 1 such as to limit overheating of the converters 1.

FIG. 10 shows a sample trend of the conversion power C and temperature T of a converter 1 over time t in the case of intensive usage (part a) and in the case of intermittent usage (part b).

Figure 2:
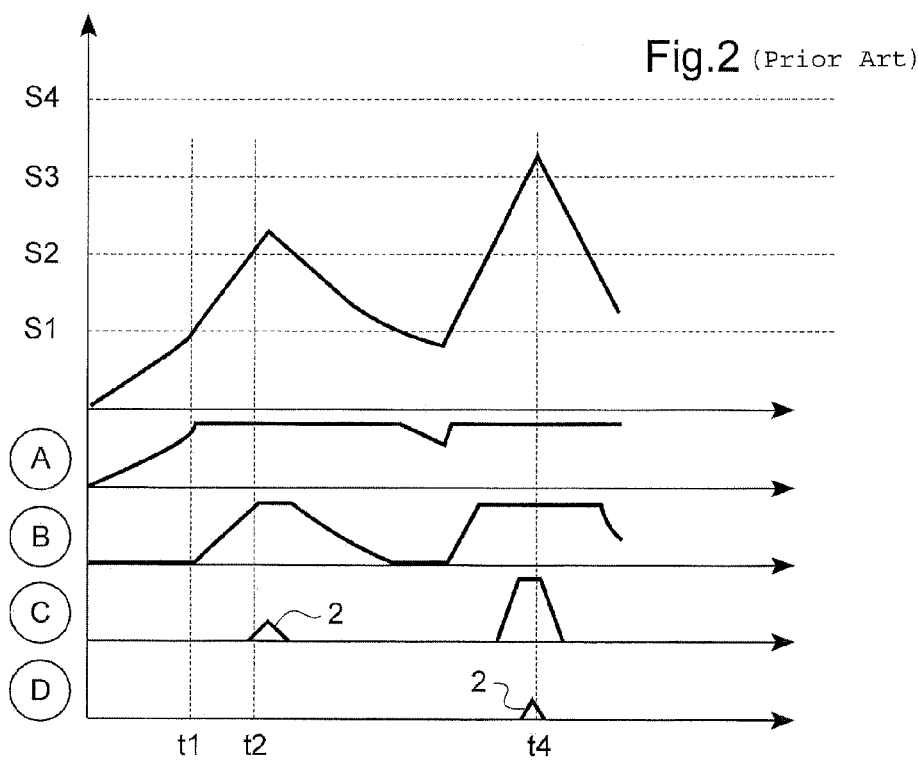
FIG. 2 is a graph of an example trend of a conversion power over time and the corresponding distribution of the power between the different converters of a multiple-converter conversion device.

In the case of intensive usage (part a), which often occurs with a power distribution according to the prior art as described in FIG. 2, the conversion power is constant and corresponds to the maximum power of the converter 1. The temperature increases progressively from the instant t0 before reaching a temperature plateau Tm at instant t3. The temperature Tm corresponding to this plateau is high, which may be harmful to operation of the conversion device 27.

In the case of intermittent usage (part b), which occurs when applying continuous switching as described above, when the conversion device 27 is not being used at full power, the power increases progressively from t0 before reaching a plateau at instant t2 corresponding to the maximum conversion power of the converter 1. The plateau extends until instant t2. The power then drops progressively, the cycle is repeated once all of the converters 1 have been used during the switching (or "rotation") according to the periodic sequence.

In this case, the temperature increases progressively, but more slowly than in part a) because the power is lower, between t0 and t1, then it continues to increase until t2 before reaching a maximum temperature Tn at instant t2, then it again drops progressively as the power decreases. The temperature Tn obtained is less than the temperature Tm because full power is only applied for a limited time, which helps to prevent excessive overheating of the converters 1.

As the temperature trend of the converter 1 over time as a function of conversion power is dependent on the thermal time constant of the converter 1, the transfer speed is then determined in relation to this time constant to limit overheating in an optimised manner. On the power ring 29, the switching speed (or transfer speed) is represented by the speed of movement in rotation of the portions about the centre of the ring 29.

Furthermore, the transfer speed may be uniform, but may also be modulated as a function of a parameter in order to improve the overall efficiency of the conversion device 27. As described previously in FIG. 8, some power distributions correspond to an efficiency of the conversion device 27 that is not optimised, while some power distributions correspond to an optimised efficiency of the conversion device 27. During application of a continuous switching, there is a succession of configurations corresponding to non-optimised efficiencies then optimised efficiencies. In order to improve the efficiency of the device 27, according to one embodiment of this invention, the power transfer speed is therefore modulated such that:

the continuous progressive switching speed of a first predetermined speed value is increased if the conversion efficiency is less than a first predetermined efficiency value, and the continuous progressive switching speed of a second predetermined speed value is reduced if the conversion efficiency is greater than a second predetermined efficiency value.

The first and second predetermined speed values are established as a function of the characteristics of the converters 1 and in particular the thermal time constant thereof. The first and second predetermined efficiency values are established as a function of a characteristic representing the efficiency of the converters 1 as a function of the conversion power.

The first and second efficiency values may be the same. The same is true for the first and second predetermined speed values.

This modulation amounts to reducing the time spent on the power distribution configurations for which efficiency is not optimised and increasing the time spent on the power distribution configurations for which efficiency is optimised.

On the power ring 29, the variation in the switching speed is represented by the variation in the speed of rotation of the portions around the ring 29.

Thus, by applying a progressive switching to the conversion device 27 comprising a plurality of converters mounted in parallel, the embodiments of this invention enable the use of all of the converters of the device in a near-equal manner over time, regardless of the total conversion power of the conversion device 27. Furthermore, by implementing continuous power switching between the converters 1, the embodiments of this invention enable overheating in the converters 1 to be limited.

Finally, the use of a power ring 29 enables distribution of power between the converters 1 to be managed simply, according to the embodiments of this invention.

Indeed, it is not necessary to store in real time the usage times or respective power draws of the converters 1 to equalise the service lives thereof or distribute the power between them. If the total conversion power varies, the movements of the first slider 31 and the second slider 33 ensure that, statistically over a usage period of the conversion device 27, the converters 1 are used for approximately identical periods of time. This is also true if the instantaneous total conversion power is less than the power supplied by one converter 1.

The method also enables the distribution of power between the converters 1 to be optimised while supplying a continuous conversion power. Indeed, in the methods in the prior art, if the total conversion power is below a threshold, one or more converters are deactivated and the output of the other converters is increased in order to improve the overall efficiency of the device, with the same total conversion power. This results in a discontinuity in the total conversion power, at least during the transition phase. Managing power distribution through the positions of the first slider 31 and the second slider 33 on the ring 29 ensure that the output signal from each converter 1 is decreased and increased progressively. The converters 1 of the conversion device 27 are not deactivated abruptly.

Furthermore, the rotation of the portions of the ring 29 (or, equivalently, the axes Δ, β separating the portions) help to improve power distribution and equalise use of the converters 1 if the total conversion power is constant. The rotation of the portions of the ring 29 also provides a continuity of the total conversion power if this latter is constant and use of the converters 1 is to be alternated.

The energy conversion device 27 may include a processing unit configured to implement the method according to the invention.

For example, the processing unit includes a module incorporating a representation of the geometric ring 29. In particular, the ring 29 may be stored in a memory in the form of several angular intervals each corresponding to a respective converter 1. The positions of the first slider 31 and the second slider 33 may correspond to respective angular values stored in a memory.

Furthermore, the distribution of power between the converters 1 may be represented by the ring 29 on a display unit in order to keep a user of the energy conversion device 27 informed.

The invention claimed is:

1. A method for distributing a total power of an energy conversion device between at least two converters in said energy conversion device, a sum of the conversion powers of the converters being the total power of the energy conversion device, the method comprising:
   converting, by the energy conversion device, energy between a first electrical entity and a second electrical entity, wherein:
      said at least two converters correspond to at least two portions of a ring, said ring being stored in a memory in a plurality of angular intervals, each corresponding to a respective converter, the at least two portions being proportional to a predetermined power value of the respective converters thereof, a combination of the at least two portions forming an entirety of the ring; and
      the total power of the energy conversion device corresponds to an arc of the ring between positions of a first moveable slider and a second moveable slider that are moveable around the ring said positions of the first slider and the second slider corresponding to respective angular values stored in the memory; and
   determining the distribution of power between the converters by positions of the first slider and the second slider that are moveable around the ring.

2. The method according to claim 1, wherein the positions of said first moveable slider and said second moveable slider are adjusted such that:
   when the total power of the energy conversion device increases, the first moveable slider is moved in a predetermined direction around the ring proportionally to the power increase and,
   when the total power of the energy conversion device drops, the second moveable slider is moved in a predetermined direction around the ring proportionally to the power decrease.

3. The method according to claim 1 wherein positions of the at least two portions of the ring may be moved in rotation about a centre of the ring, the movement of the at least two portions corresponding to a modification of the power distribution between the different converters.

4. The method according to claim 3, wherein the at least two portions are moved in rotation continuously.

5. The method according to claim 3, wherein the movement in rotation of the at least two portions is a function of efficiency characteristics of the at least two converters.

6. The method according to claim 3, wherein a speed of movement in rotation of the at least two portions is a function of the thermal time constant of the at least two converters.

7. The method according to claim 3, wherein a speed of movement in rotation of the at least two portions is increased by a first predetermined speed value when a conversion efficiency of the energy conversion device is less than a first predetermined efficiency value.

8. The method according to claim 3, wherein a speed of movement in rotation of the at least two portions is reduced by a second predetermined speed value if the conversion efficiency of the energy conversion device is greater than a second predetermined efficiency value.

9. An energy conversion device for converting energy between a first electrical entity and a second electrical entity, the energy conversion device comprising:
   at least two converters;
   a processing unit configured to implement a power distribution method, the processing unit comprising:
      a module incorporating a representation of a geometric ring, said ring being stored in a memory in a plurality of angular intervals each corresponding to a respective converter, said at least two converters corresponding to at least two portions of the ring, the at least two portions being proportional to a predetermined power value of the respective converters thereof, the combination of the at least two portions forming the ring in its entirety;
      the memory for storing positions of a first slider and a second slider, the first and second sliders being moveable around the ring, said positions of the first slider and the second slider corresponding to respective angular values stored in the memory, the total power of the energy conversion device corresponding to an arc of the ring between the positions of the first slider and the second slider that are moveable around the ring, and
      a module for distributing the power between the at least two converters determined by the positions of the first slider and the second slider that are moveable around the geometric ring.

10. The device according to claim 9, in which said at least two converters comprise:
   a first input terminal connected firstly to a first extremity of a branch comprising two switches mounted in series and secondly to a first output terminal, and
   a second input terminal connected to a midpoint of the branch by an inductive element, a second extremity of the branch being a second output terminal,
   the first input terminals of the converters being connected to each other, the second input terminals of the at least two converters being connected to each other, the first output terminals of the at least two converters being connected to each other, and the second output terminals of the at least two converters also being connected to each other.

11. The device according to claim 10, in which the switches of the at least two converters include a transistor mounted in parallel with a diode.

* * * * *